Aug. 17, 1965  E. P. SCHREYER  3,201,566
THERMOSTATICALLY CONTROLLED ELECTRICALLY
HEATED COOKING UTENSIL
Filed Feb. 18, 1964  2 Sheets-Sheet 1

INVENTOR.
Edward Peter Schreyer
BY
AGENT

Aug. 17, 1965   E. P. SCHREYER   3,201,566
THERMOSTATICALLY CONTROLLED ELECTRICALLY
HEATED COOKING UTENSIL
Filed Feb. 18, 1964

INVENTOR.
Edward Peter Schreyer
BY
*H. Gibner Lehmann*
AGENT

United States Patent Office 3,201,566
Patented Aug. 17, 1965

3,201,566
THERMOSTATICALLY CONTROLLED ELECTRICALLY HEATED COOKING UTENSIL
Edward Peter Schreyer, % Whitfield Laboratories Inc., Box 293, Bethel, Conn.
Filed Feb. 18, 1964, Ser. No. 345,719
4 Claims. (Cl. 219—441)

This invention relates to electrically heated devices and more particularly to electrically heated cooking utensils which comprise a container in the bottom of which is embedded an electrical heating element.

It has been proposed to control the heating of such devices by means of a thermostatically operated switch mounted in a connector plug through which electric current is supplied to the heating element, the said connector plug having mounted on it a probe which receives heat from the heating element or container bottom and conducts it to temperature responsive switch actuating means.

In the previously proposed devices the probe has been received in a socket or bore in a block of metal integral with the bottom of the container so that the said probe was wholly surrounded by the metal of the block.

The object of controlling the heating of such cooking utensils by means of a thermostatically operated switch mounted in a connector plug instead of in the utensil itself is that the utensil can then be wholly immersed in water for washing purposes without risk of damage to the electrical components. However, with a socket or bore to receive the probe, it is very difficult to prevent the collection of grease and other foreign matter in the said socket or bore which not only tends to reduce the effective conduction of heat to the probe but also provides a source of contamination.

It is the object of the present invention to avoid these disadvantages and, accordingly, one object of the invention is to provide an improved electrically heated cooking utensil having a heat well, wherein cleaning of the well is greatly simplified and facilitated.

Another object of the invention is to provide an improved utensil as above set forth, wherein there is less likelihood of the heat well becoming clogged, coated or contaminated with foreign matter.

A still further object of the invention is to provide a utensil as above characterized, wherein an effective transfer of heat is had between the utensil container and the control plug.

According to the present invention in an electrically heated cooking utensil comprising a metal container in the bottom of which is embedded an electrical heating element and a detachable connector plug through which electric current is supplied to the heating element, the connector plug having mounted in it thermostatically controlled switch means operated by heat collected from the container bottom by a probe mounted on said connector plug, the container bottom is formed with an open groove to receive the probe so that the said probe is only partially surrounded by the metal of the container when the connector plug is connected to said container.

Further, according to the invention, in an electrically heated cooking utensil comprising a metal container in the bottom of which is embedded an electrical heating element, the said heating element being adapted to receive electric current through a detachable connector plug having mounted in it thermostatically controlled switch means operated by heat collected from the container bottom by a probe mounted on said connector plug, the container bottom is formed with an open groove to receive the probe so that the said probe is only partially surrounded by the metal of the container when the connector plug is connected to said container.

A feature of the invention resides in the simplicity and economy of manufacture which characterizes the structure provided by the invention.

Other features and advantages will hereinafter appear.

The invention is hereinafter described with reference to the accompanying drawings, in which.

Figure 1:
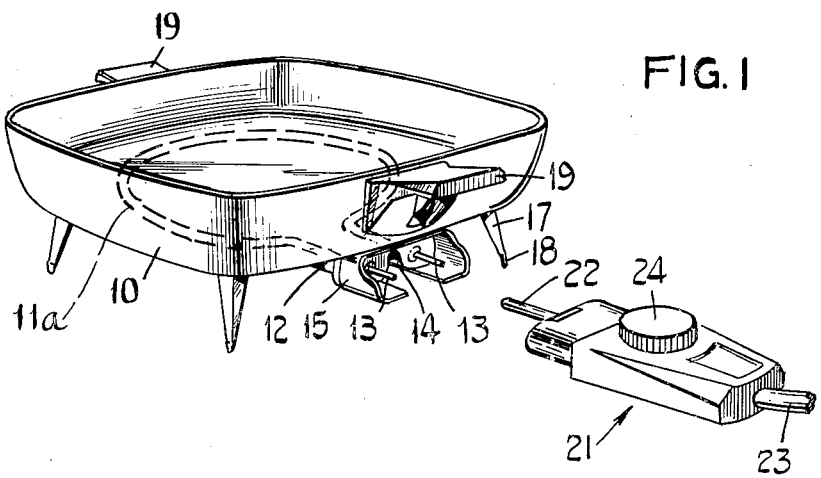
FIG. 1 is a perspective view showing one form of cooking utensil according to the invention.

Referring to the drawings, the cooking utensil comprises a shallow pan 10, conveniently an aluminum casting having an integral substantially annular rib 11 on the underside of its bottom in which is embedded an elongated electric resistance element 11a for heating the pan, the heating element being of known type commonly referred to as a "sheathed element," or Calrod unit, the name "Calrod" being a registered trademark. The rib 11 is interrupted at one point where it and the heating element have spaced parallel terminal portions 11b, and in the gap between these ends is a block 12, 12a of metal integral with the pan and rib. The ends of the resistance element 11a lie in the block 12, 12a and are connected to contact pins 13, insulated from the said block and projecting, parallel one to the other, towards one side of the pan. Between the two contact pins 13 a groove 14 is formed in the block 12, 12a, the groove having slightly divergent sides and having its center line parallel to and midway between the contact pins 13. A sheet-metal shield 15 surrounding the contact pins is secured to the undersurface of the block 12, 12a by two screws 16, one on each side of the groove 14. The pan 10 is mounted on four legs 17 each formed with a foot 18 of heat insulating material, and has handles 19 of similar material secured to two opposite sides thereof.

The connector plug is indicated generally by the reference 21, and has sockets 21a to receive the contact pins 13 as is common with electrical connector plugs for similar purposes. A cylindrical metal probe 22 projects from the plug 21 between the two sockets 21a so as to make contact with the "bottom" of the groove 14 when the pins 13 are inserted in the plug sockets 21a. The plug 21 includes switch means 21b operated thermostatically by heat absorbed by the probe 22 from the block 12 to open the said switch means as the temperature rises and thus break the connection between one of the sockets and one of the conductors of a multiple-conductor cable 23 by which the plug 21 is connected to a source of electric current. Control means 24 are provided on the plug 21 to adjust the thermostatically controlled switch and so vary the temperature to which the pan 10 is heated. Connector plugs embodying adjustable thermostatically controlled switches have previously been proposed and are available on the market, so no detailed description thereof will be given herein. It is preferred that a connector plug according to my British Patent No. 789,860 shall be used, since the thermostatically controlled switch therein has a high degree of sensitivity and responds accurately to temperature changes.

Figure 3:
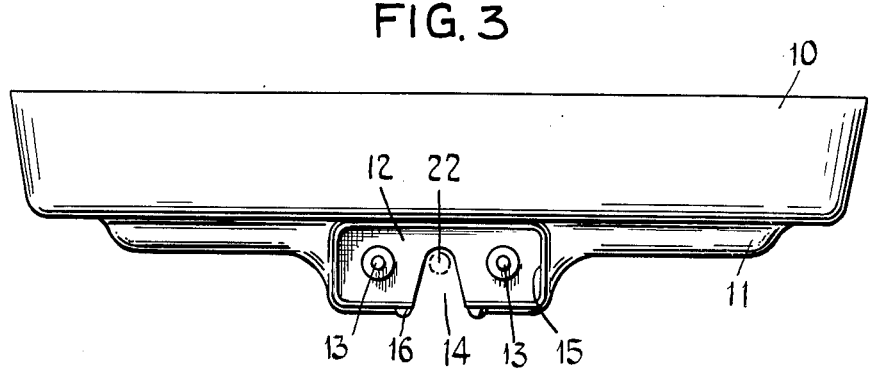
FIG. 3 is a side view of the cooking utensil taken from the side at which the connector plug if fitted and showing the probe in chain dotted lines.
Figure 4:
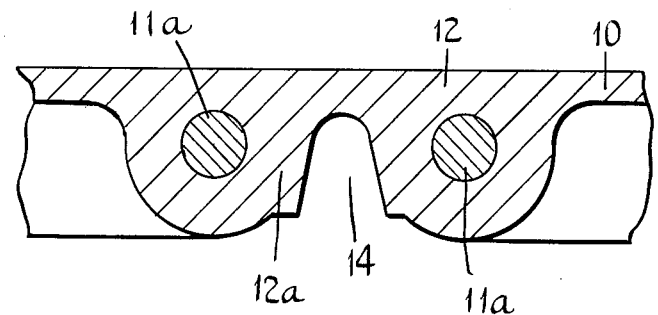
FIG. 4 is a section on the line 4—4 of FIG. 2.
Figure 5:
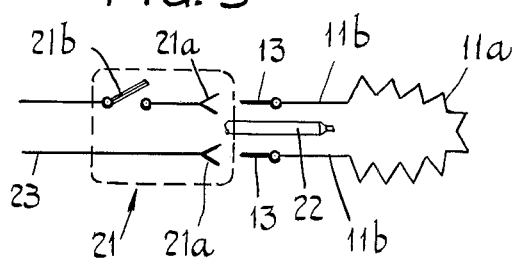
FIG. 5 is a schematic or diagrammatic representation of the electrical circuit components of the utensil.

When the connector plug 21 is coupled to the pan 10, the probe 22 lies in the "bottom" of the groove 14, its position being shown in chain dotted lines in FIG. 3, and makes contact with the walls of the groove. Although it is not wholly surrounded by the metal of the block 12 it is in contact with the said block, and it is found that its temperature conforms to that of the pan bottom with sufficient accuracy to cause the thermostatically operated switch to maintain the pan at the required temperature.

The provision of an open groove such as the groove 14 to receive the probe, instead of a hole or socket which completely surrounds the probe, has several advantages. It simplifies the production of the pan, because it can be formed during the die-casting operation by which the pan is formed, instead of having to be drilled separately and it can be readily cleaned and dried so that the surface is not contaminated so as to reduce the effective transfer of heat, nor is there any danger of moisture being left in it which might in time cause oxidation of the aluminum and/or evaporate during subsequent heating and cause leakage of electric current.

It will be understood that the shape of the groove 14 may be different from that shown in the drawing. For example, the "bottom" of the groove may be flat, the probe being formed with flat sides to engage the "bottom" and sides of the groove.

With the construction shown the probe 22 receives heat from the solid metal block 12, 12a by radiation and also by convection currents. The radiated heat is considerable, due to the close proximity of the probe with respect to the adjoining surfaces of the slot 14, as seen in FIG. 3. If the probe 22 is made to actually engage the walls of the groove 14 then there would be added the heat which is transferred by actual conduction.

Figure 2:
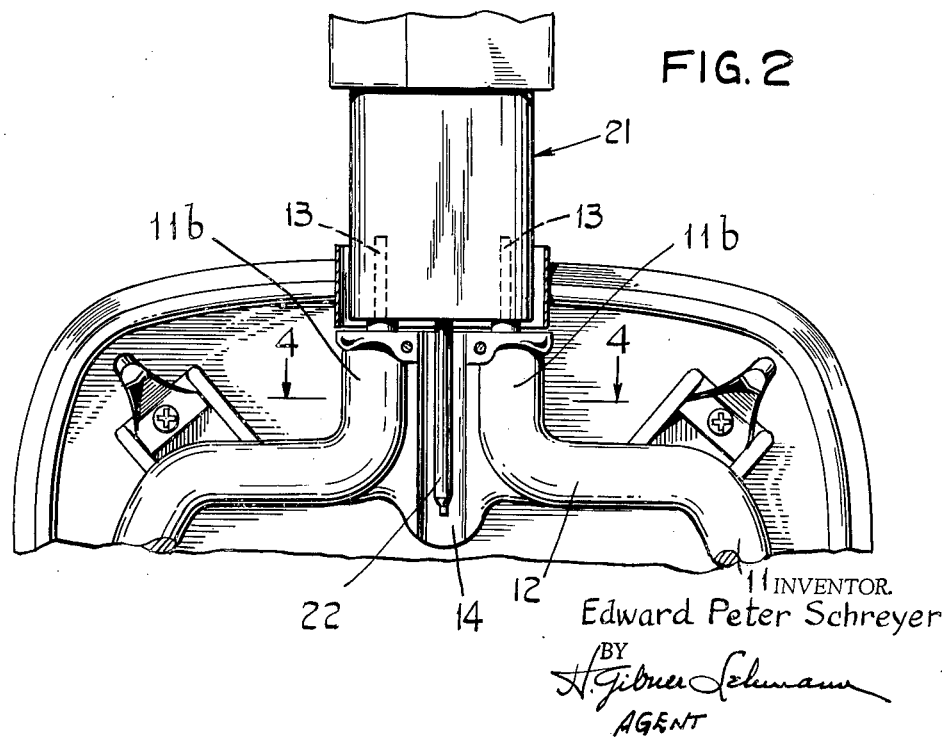
FIG. 2 is a partial underneath plan view of the cooking utensil shown in FIG. 1.

It will be noted from an inspection of FIG. 3 that the probe 22 is located in line with the end portions labelled 11b in FIG. 2) of the rib 11 and heating element 11a. Such disposition of the probe is advantageous in enabling the maximum amount of heat being transferred, for the purpose of effecting the desired control of the thermostatic switch 21b.

Variations and modifications may be made within the scope of the claims, and portions of the improvement may be used without others.

I claim:
1. An electrically heated cooking utensil comprising, in combination:
    (a) a metal container having embedded in its bottom an electrical heating element.
    (b) electrical contacts carried by the container and connected to said heating element, said contacts being engageable with cooperable contacts of a circuit-controlling connector plug having an elongate heat-receiving control probe,
    (c) said container bottom having an elongate open groove adapted to receive the control probe, said groove being otherwise completely exposed and accessible from the exterior of the container and receiving the probe of the plug in such manner that the latter is only partially surrounded by the metal of the container and has random contact with the same, thereby to be subjected to heat radiated from the container and to heat carried by convection from the container for the purpose of effecting a circuit control in the plug.

2. An electrically heated cooking utensil comprising, in combination:
    (a) a metal container having embedded in its bottom an electrical heating element,
    (b) electrical contacts carried by the container and connected to said heating element,
    (c) a detachable connector plug adapted to be removably carried by the container, said plug having contacts cooperable with those of the container to supply electric current to the heating element thereof,
    (d) thermostatically controlled switch means carried by the connector plug,
    (e) a heat-receiving probe on the connector plug, disposed in heat exchanging relation to the said switch means to effect actuation of the same in response to heating and cooling of the probe,
    (f) said container bottom having an elongate open groove adapted to receive the control probe, said groove being otherwise completely exposed and accessible from the exterior of the container,
    (g) the probe of the plug when the latter is carried by the container being located in and spaced from the walls of said groove whereby contact therewith is random and of questionable intimacy, and whereby the probe is only partially surrounded by the metal of the container and is subjected to heat radiated from the container and to heat carried by the convection from the container for the purpose of actuating the thermostatically controlled switch.

3. A utensil as in claim 2, wherein the container bottom has an interrupted generally annular rib provided with a gap, said rib protruding from the undersurface of the bottom, said bottom including a block of solid metal located in the gap of the rib and constituted to be integral with the container bottom and rib, said elongate, probe-receiving groove being disposed in the said metal block.

4. A utensil as in claim 2, wherein at the gap in the rib the latter has short, spaced parallel portions, and wherein the probe is located at least partially between said parallel portions.

References Cited by the Examiner

UNITED STATES PATENTS 3,007,028   10/61   Sorenson _____ 219—442
3,097,289   7/63    Clark.

RICHARD M. WOOD, *Primary Examiner.*
ANTHONY BARTIS, *Examiner.*